US009086996B2

(12) United States Patent
Lee et al.

(10) Patent No.: US 9,086,996 B2
(45) Date of Patent: Jul. 21, 2015

(54) NONVOLATILE MEMORY, READING METHOD OF NONVOLATILE MEMORY, AND MEMORY SYSTEM INCLUDING NONVOLATILE MEMORY

(71) Applicant: Samsung Electronics Co., Ltd., Suwon-si, Gyeonggi-do (KR)

(72) Inventors: Seungjae Lee, Hwaseong-si (KR); Jinyub Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 38 days.

(21) Appl. No.: 13/941,568

(22) Filed: Jul. 15, 2013

(65) Prior Publication Data
US 2014/0026232 A1 Jan. 23, 2014

(30) Foreign Application Priority Data
Jul. 19, 2012 (KR) ........................ 10-2012-0078838

(51) Int. Cl.
G06F 21/78 (2013.01)
G06F 12/14 (2006.01)
G06F 21/79 (2013.01)

(52) U.S. Cl.
CPC ............ *G06F 12/14* (2013.01); *G06F 12/1433* (2013.01); *G06F 21/78* (2013.01); *G06F 21/79* (2013.01); *G06F 2212/202* (2013.01)

(58) Field of Classification Search
None
See application file for complete search history.

(56) References Cited

U.S. PATENT DOCUMENTS

| 4,931,997 | A | 6/1990 | Mitsuishi et al. |
| 6,088,262 | A | 7/2000 | Nasu |
| 6,445,606 | B1 * | 9/2002 | Khoury ........................ 365/96 |
| 7,313,024 | B2 | 12/2007 | Lee |
| 2008/0189557 | A1 * | 8/2008 | Pipitone et al. ............... 713/193 |
| 2011/0119564 | A1 | 5/2011 | Kim et al. |
| 2012/0117663 | A1 * | 5/2012 | Hirota et al. .................... 726/29 |
| 2012/0260349 | A1 * | 10/2012 | Nagai et al. .................... 726/28 |

FOREIGN PATENT DOCUMENTS

| JP | 2000-222888 | 8/2000 |
| JP | 2003-186739 A | 7/2003 |
| JP | 2004-288257 | 10/2004 |

* cited by examiner

*Primary Examiner* — David Pearson
(74) *Attorney, Agent, or Firm* — Volentine & Whitt, PLLC

(57) ABSTRACT

A nonvolatile memory device includes a memory cell array and a read/write circuit connected to the memory cell array through bit lines. The read method of the nonvolatile memory device includes receiving a security read request, receiving security information, and executing a security read operation in response to the security read request. The security read operation includes reading of security data from the memory cell array using the read/write circuit, storing of the read security data in a register, performing security decoding on the read security data stored in the register using the received security information, resetting the read/write circuit, and outputting a result of the security decoding.

17 Claims, 16 Drawing Sheets

NONVOLATILE MEMORY, READING METHOD OF NONVOLATILE MEMORY, AND MEMORY SYSTEM INCLUDING NONVOLATILE MEMORY

CROSS-REFERENCE TO RELATED APPLICATIONS

A claim for priority under 35 U.S.C. §119 is made to Korean Patent Application No. 10-2012-0078838 filed Jul. 19, 2012, in the Korean Intellectual Property Office, the entire contents of which are hereby incorporated by reference.

BACKGROUND

The inventive concepts described herein relate to a nonvolatile memory, a read method of a nonvolatile memory, and a memory system including a nonvolatile memory.

A semiconductor memory device is a memory device which is fabricated using semiconductors such as silicon (Si), germanium (Ge), gallium arsenide (GaAs), indium phosphide (InP), and the like. Semiconductor memory devices are generally classified as either volatile memory devices or nonvolatile memory devices.

The volatile memory devices are characterized by the loss of stored contents at a power-off condition. Examples of volatile memory devices include certain types of random access memory (RAM) such as a static RAM (SRAM), a dynamic RAM (DRAM), a synchronous DRAM (SDRAM), and the like. In contrast, nonvolatile memory devices are characterized by the retention of stored contents even during power-off condition. Examples of nonvolatile memory devices include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and the like. Among these, the flash memory device is generally configured as either NOR type flash memory or and NAND type flash memory.

SUMMARY

Example embodiments of the inventive concept provide a read method of a nonvolatile memory, where the nonvolatile memory device includes a memory cell array and a read/write circuit connected to the memory cell array through bit lines. The method includes receiving a security read request, receiving security information, and executing a security read operation in response to the security read request. The security read operation includes reading of security data from the memory cell array using the read/write circuit, storing of the read security data in a register, performing security decoding on the read security data stored in the register using the received security information, resetting the read/write circuit, and outputting a result of the security decoding.

Example embodiments of the inventive concept also provide a nonvolatile memory which includes a memory cell array including a security data area and a user data area, a read/write circuit connected to the memory cell array through bit lines, and control logic including a register. The control logic is configured to execute a security read operation in response to a received security read request and security information. The security read operation includes reading of security data from the security data area of the memory cell array using the read/write circuit, storing of the read security data in the register of the control logic, performing security decoding on the read security data stored in the register using the received security information, resetting the read/write circuit, and outputting a result of the security decoding.

Example embodiments of the inventive concept also provide a memory system which includes a nonvolatile memory including a memory cell array and a read/write circuit, where the memory cell array includes a security data area and a user data area, and the read/write circuit is connected to the memory cell array through bit lines. The memory system further includes a controller configured to control the nonvolatile memory. The nonvolatile memory is configured to execute a security read operation in response to a security read request and security information received from the controller. The security read operation including reading of security data from the security data area of the memory cell array using the read/write circuit, performing security decoding on the read security data using the received security information, resetting the read/write circuit, and outputting a result of the security decoding.

BRIEF DESCRIPTION OF THE FIGURES

The above and other objects and features will become apparent from the description that follows with reference to the accompanying figures, wherein like reference numerals refer to like parts throughout the various figures unless otherwise specified.

DETAILED DESCRIPTION

Figure 1:
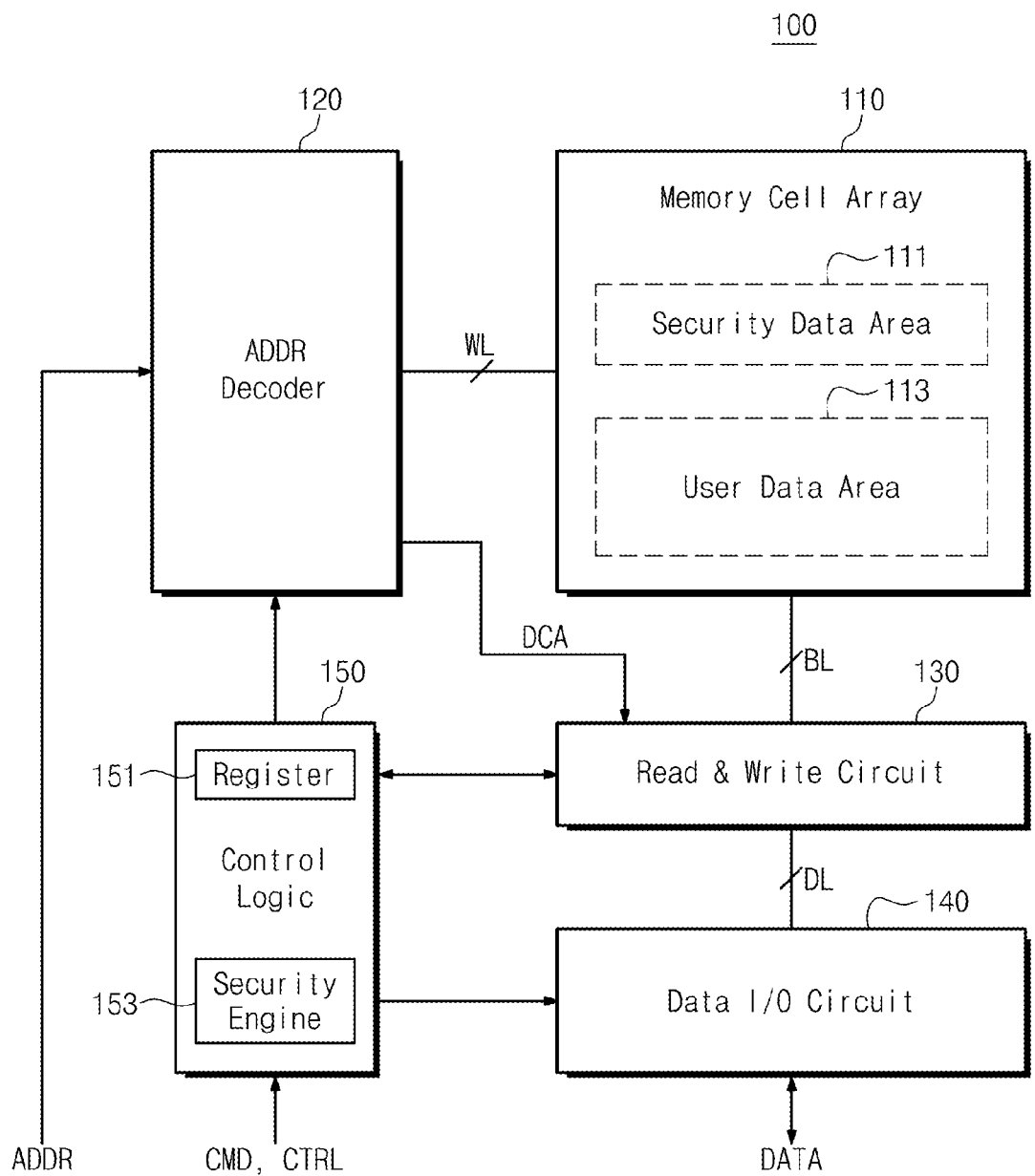
FIG. 1 is a block diagram schematically illustrating a nonvolatile memory according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Embodiments of the inventive concept will be described with respect to a NAND flash memory. However, the inventive concept is not limited to NAND flash memory. That is, the inventive concept may be applied to a variety of different types of nonvolatile memories such as an Electrically Erasable and Programmable ROM (EEPROM), a NOR flash memory, a phase-change RAM (PRAM), a magnetic RAM (MRAM), a resistive RAM (RRAM), a ferroelectric RAM (FRAM), and so one.

FIG. 1 is a block diagram schematically illustrating a nonvolatile memory according to an embodiment of the inventive concept. Referring to FIG. 1, a nonvolatile memory 100 may include a memory cell array 110, an address decoder 120, a read/write circuit 130, a data input/output circuit 140, and control logic 150.

The memory cell array 110 may be connected to the address decoder 120 via word lines WL and to the read/write circuit 130 via bit lines BL. The memory cell array 110 may include a plurality of memory cells. Memory cells arranged in each row of the memory cell array 110 may be connected with respective word lines, and memory cells arranged in each column of the memory cell array 110 may be connected with respective bit lines. The groups of memory cells contained in each column of the memory cell array 110 may be referred to as a cell string, where each cell string may be connected to a respective bit line. In example embodiments, each of memory cells may store one or more bits of data.

The memory cell array 110 may include a security data area 111 and a user data area 113. The security data area 111 may store security data needed for security decoding. The security data area 111 may be an area which is programmed once after the nonvolatile memory 100 is fabricated. The user data area 113 may be area which is programmed, read, and erased by a user.

The address decoder 120 may be connected to the memory cell array 110 via the word lines WL. The address decoder 120 may operate responsive to control of the control logic 150. The address decoder 120 may receive an address ADDR from an external device.

The address decoder 120 may decode a row address of the input address ADDR, and may select the word lines WL using the decoded row address. The address decoder 120 may decode a column address of the input address ADDR to transfer the decoded column address DCA to the read/write circuit 130. In example embodiments, the address decoder 120 may include elements such as a row decoder, a column decoder, an address buffer, and so on.

The read/write circuit 130 may be connected to the memory cell array 110 via the bit lines BL. The read/write circuit 130 may be connected to the data input/output circuit 140 via data lines DL. The read/write circuit 130 may operate responsive to control of the control logic 150. The read/write circuit 130 may select the bit lines BL in response to the decoded column address DCA from the address decoder 120.

In example embodiments, the read/write circuit 130 may receive data from the data input/output circuit 140 to write the receive data in the memory cell array 110. The read/write circuit 130 may read data from the memory cell array 110 to output the read data to the data input/output circuit 140. The read/write circuit 130 may read data from a first storage area of the memory cell array 110 to write the read data to a second storage area thereof. That is, the read/write circuit 130 may perform a copy-back operation.

In example embodiments, the read/write circuit 130 may include constituent elements such as a page buffer (or, a page register), a column selecting circuit, a data buffer, and the like. In other example embodiments, the read/write circuit 130 may include constituent elements such as a sense amplifier, a write driver, a column selecting circuit, a data buffer, and the like.

The data input/output circuit 140 may be connected to the read/write circuit 130 via the data lines DL. The data input/output circuit 140 may operate responsive to control of the control logic 150. The data input/output circuit 140 may be configured to exchange data with an external device. The data input/output circuit 140 may be configured to transfer data provided from the external device to the read/write circuit 130 via the data lines DL. The data input/output circuit 140 may be configured to output data transferred from the read/write circuit 130 via the data lines DL to the external device. In example embodiments, the data input/output circuit 140 may include a constituent element such as a data buffer.

The control logic 150 may be configured to control the address decoder 120, the read/write circuit 130, and the data input/output circuit 140. The control logic 150 may be configured to control an overall operation of the nonvolatile memory 100. The control logic 150 may operate responsive to a control signal CTRL and a command CMD provided from the external device.

The control logic 150 may control the address decoder 120 and the read/write circuit 130 to perform a normal read operation and a security read operation. After the security read operation is performed, the control logic 150 may reset devices of storing the read security data.

The control logic 150 may include a register 151 and a security engine 153. The register 151 may store security data read during a security read operation. The security engine 153 may perform security decoding based on security data stored in the register 151. A security decoding result may be stored in the register 151. The security decoding result stored in the register 151 may be output through the data input/output circuit 140.

Figure 2:
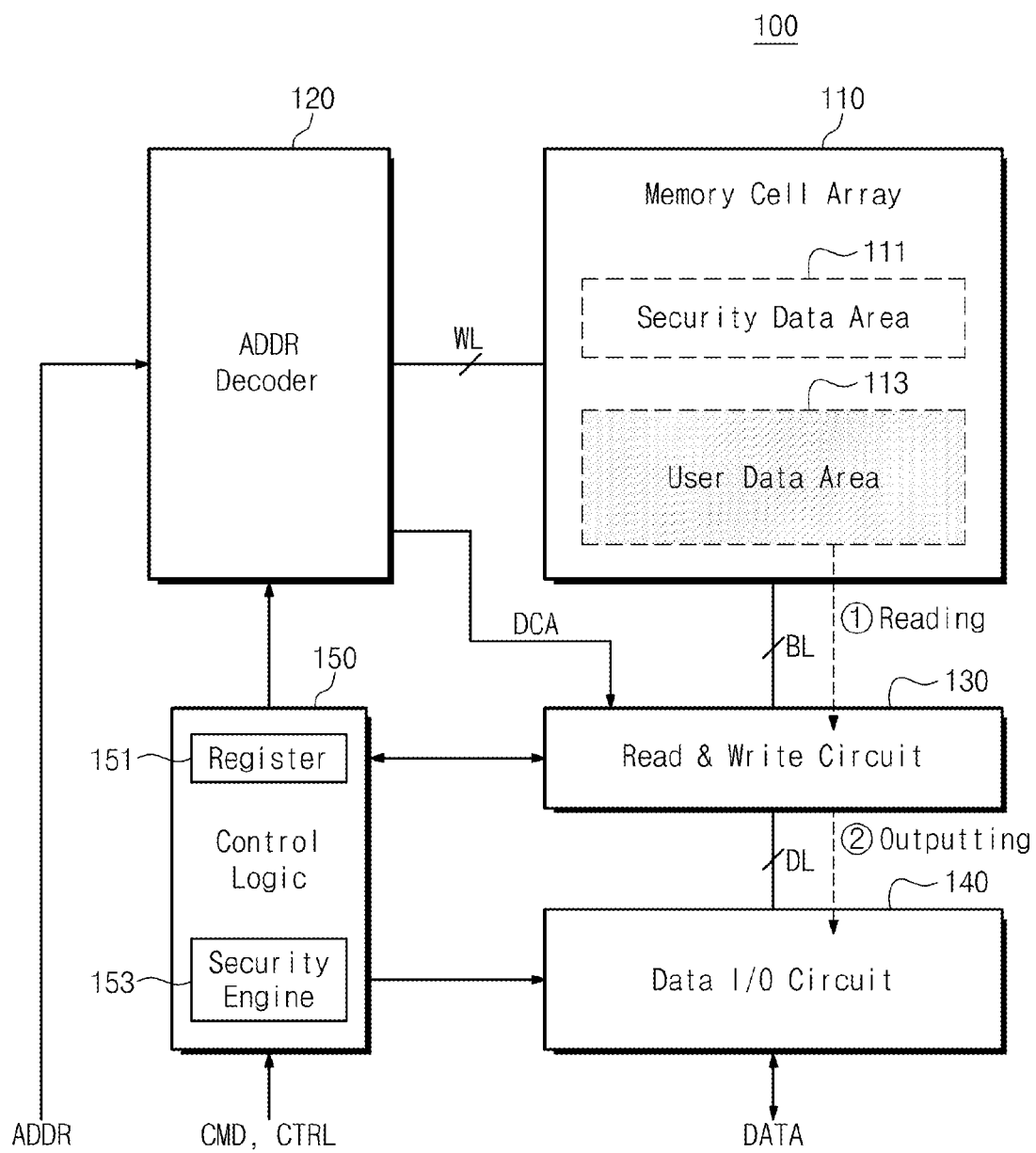
FIG. 2 is a diagram for reference in describing a normal read operation of the nonvolatile memory shown in FIG. 1.

FIG. 2 is a diagram for reference in describing a normal read operation of the nonvolatile memory shown in FIG. 1. Referring to FIG. 2, when a normal read command is received, the read/write circuit 130 may be responsive to control of the control logic 150 to read and store user data from the user data area 113. This operation is represented by ① in FIG. 2. Then, as represented by ② in FIG. 2, the user data stored in the read/write circuit 130 may be output to an external device through a data input/output circuit 140.

Figure 3:
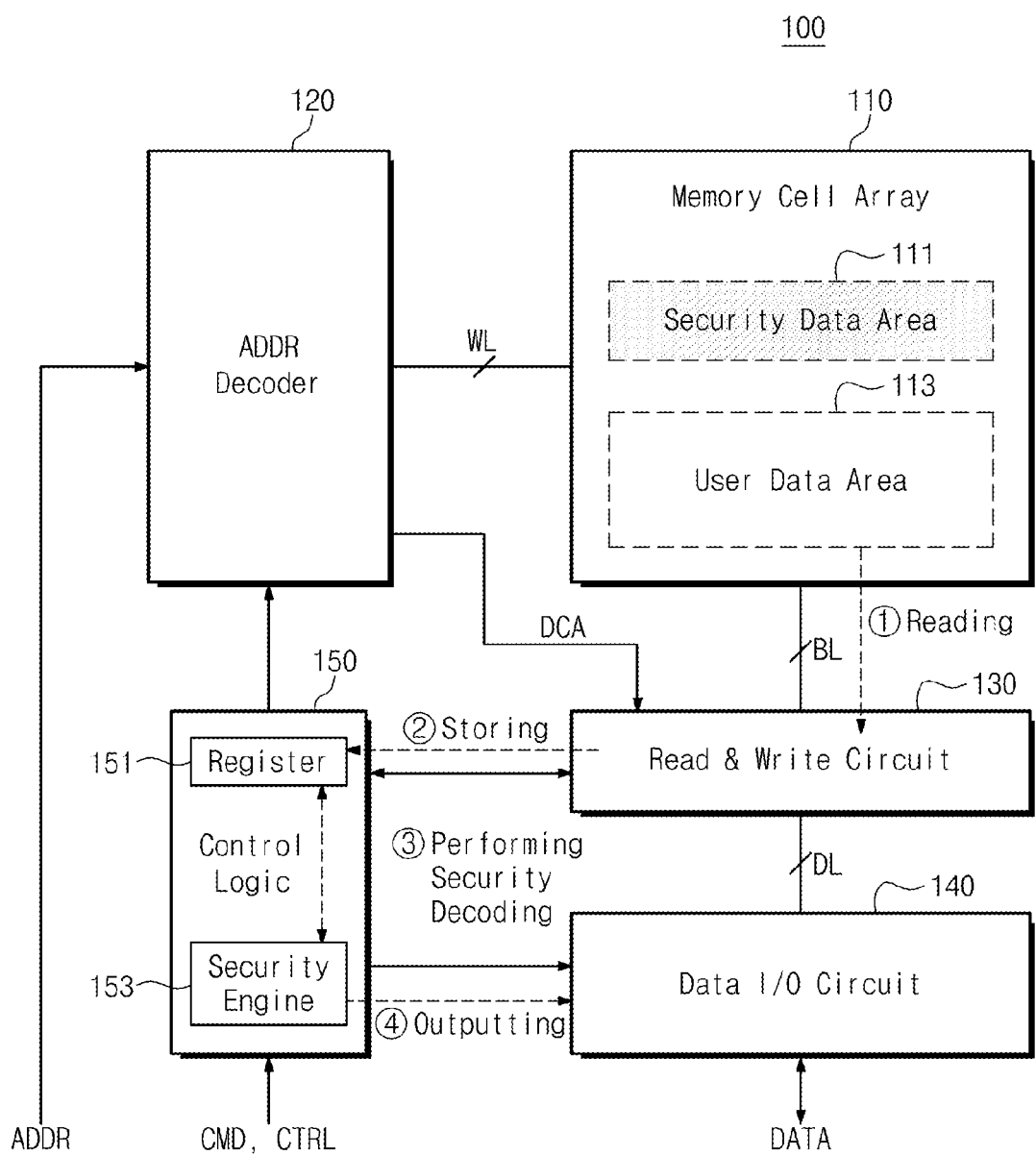
FIG. 3 is a diagram for reference in describing a security data read operation of the nonvolatile memory shown in FIG. 1.

FIG. 3 is a diagram for reference in describing a security data read operation of the nonvolatile memory in FIG. 1. A security data read operation may be a read operation in which data read from memory cells of the memory cell array 110 is processed, and a processed result is output without external outputting of the read data. Referring to FIG. 3, when a security read command is received, a read/write circuit 130 may responsive to control of control logic 150 to read and store security data from a security data area 111. This is represented by ① in FIG. 3.

Then, as represented by ② in FIG. 3, the security data stored in the read/write circuit 130 may be stored in the register 151 of the control logic 150.

The security engine 153 may perform security decoding on the security data stored in the register 151. The security engine 153 may perform security decoding based on the security data stored in the register 151 and security information received from the external device. This is represented by ③ in FIG. 3. A security decoding result may be stored in the register 151. Also, as represented by ④ in FIG. 3, the security decoding result may be output to the external device through the data input/output circuit 140.

Security decoding may include AES (Advanced Encryption Standard) decoding. In this case, the nonvolatile memory 100 may store AES decoded data as security data. The nonvolatile memory 100 may receive a key for AES decoding as security information. The control logic 150 may compare the AES decoded data with predetermined data, and may determine whether the AES decoding is successful, based on a comparison result. In the nonvolatile memory 100, whether the security decoding (AES decoding) is successfully performed may be stored in the register 151 as a security decoding result.

The nonvolatile memory 100 may store a key for AES decoding as security data. The nonvolatile memory 100 may receive AES encoded data as security information. The control logic 150 may compare the AES decoded data with predetermined data, and may determine whether AES decoding is successful, based on a comparison result. In the nonvolatile memory 100, whether security decoding (AES decoding) is successfully performed may be stored in the register 151 as a security decoding result.

Referring to FIGS. 2 and 3, data read from memory cells at a normal read operation may be directly output to an external device through a read/write circuit 130 and a data input/output circuit 140. Security data read from memory cells during a security read operation may be transferred to and processed (security decoding) by the control logic 150, and a processed result (a security decoding result) may be output to the external device. Security data read from memory cells at the security read operation may be inhibited from being output to the external device.

When a security read operation is performed, read security data may be stored in the read/write circuit 130. In general, the read/write circuit 130 may be reset when programming, reading, or erasing is performed, and may not be reset after reading is performed. For example, at programming, the read/write circuit 130 may be reset to receive and store data to be programmed. Upon reading, the read/write circuit 130 may be reset to read and store data stored in memory cells. Upon erasing, the read/write circuit 130 may be reset to be set to a state for erasing memory cells.

Thus, after a security read operation is performed, it is possible for security data stored in the read/write circuit 130 to be leaked out to the external device through probing or command manipulation. Likewise, is possible for security data stored in the register 151 to be leaked out to the external device.

The nonvolatile memory 100 according to an embodiment of the inventive concept may be configured to reset devices (e.g., a read/write circuit 130 or a register 151) in which security data read at a security read operation is stored.

Figure 4:
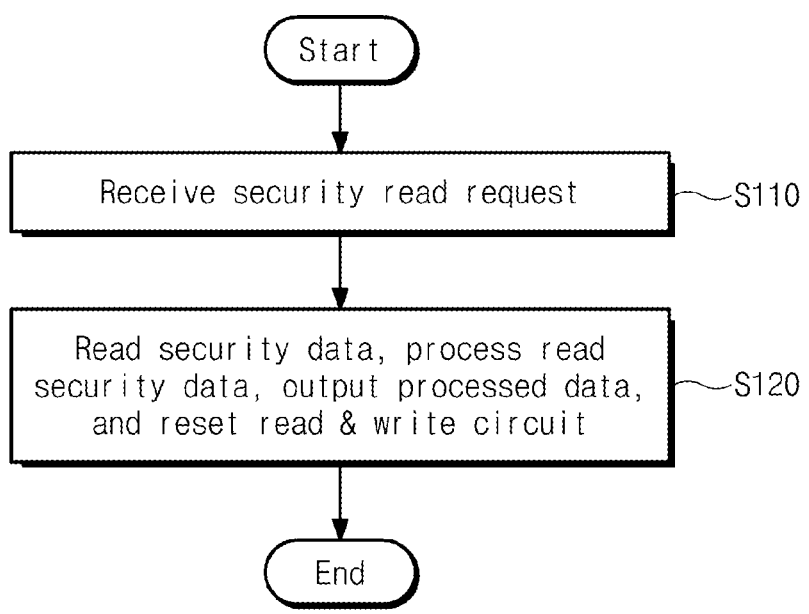
FIG. 4 is a flow chart illustrating a read method according to an embodiment of the inventive concept.

FIG. 4 is a flow chart illustrating a read method according to an embodiment of the inventive concept. Referring to FIGS. 1 and 4, in operation S110, a security read operation may be requested. That is, the nonvolatile memory 100 may receive a security read request.

For example, the nonvolatile memory 100 may receive a command indicating a security read operation to identify a security read request. The nonvolatile memory 100 may receive a general read command, and may identify the security read request based on an address indicating a security data area 111.

In operation S120, the nonvolatile memory 100 may read security data, process the read security data, output the processed data, and reset a read/write circuit 130.

In example embodiments, a read operation executed according to the security read request may be accomplished by selecting a word line connected to memory cells of the security data area 111 through an address decoder 120, reading security data from the memory cells of the security data area 111 connected to the selected word line through a read/write circuit 130, processing the read security data through control logic 150, and outputting the processed data through a data input/output circuit 140. The read/write circuit 130 may be reset before the read operation executed according to the security read request is completed.

Figure 5:
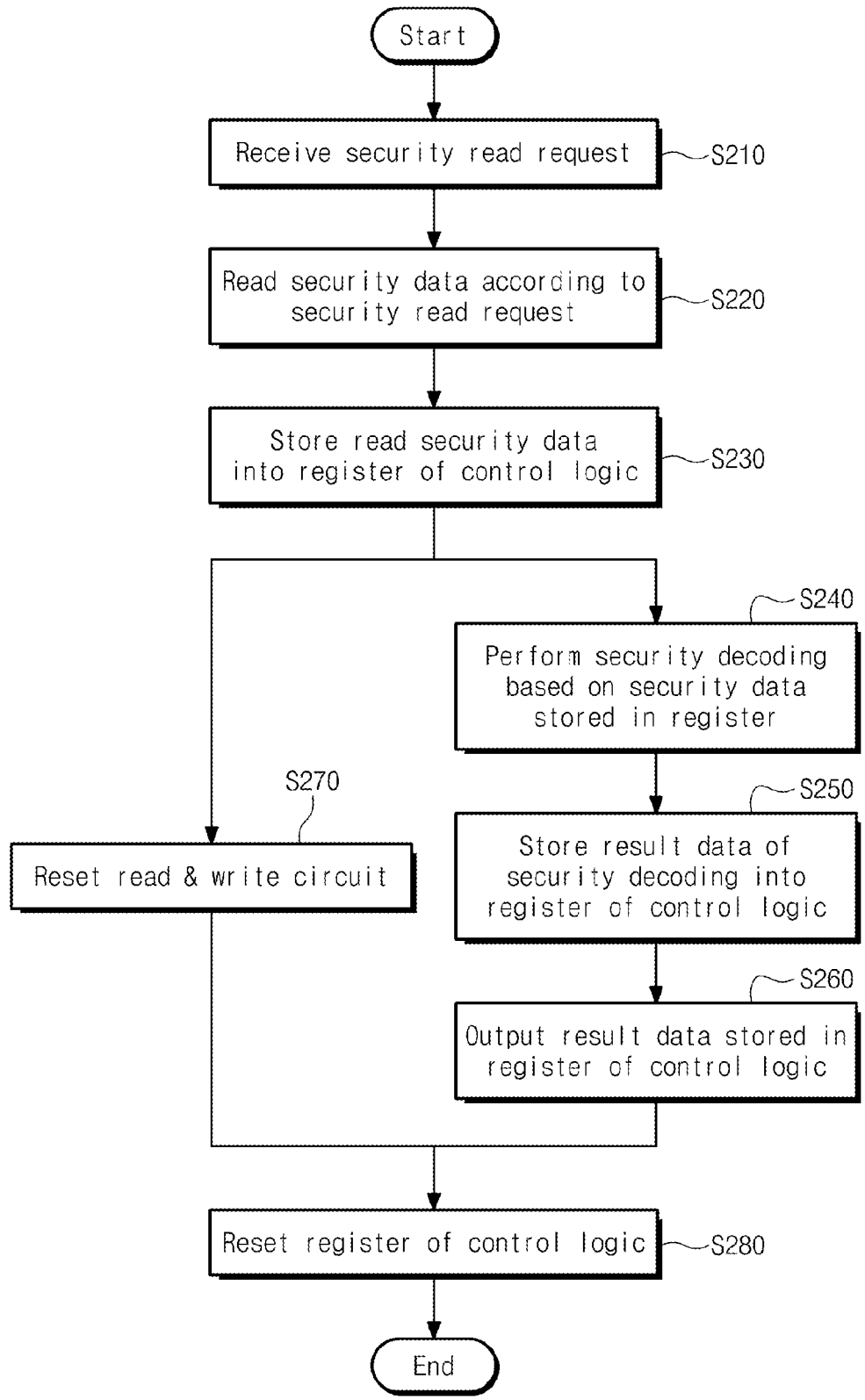
FIG. 5 is a flow chart illustrating an embodiment of a read method corresponding to the read method shown FIG. 4.

FIG. 5 is a flow chart illustrating a read method corresponding to the read method shown in FIG. 4. Referring to FIGS. 1 and 5, in operation S210, a security read request may be received.

In operation S220, security data may be read in response to the security read request. The read/write circuit 130 may read and store security data stored in the security data area 111 of the memory cell array 110.

In operation S230, the read security data may be stored in the register 151 of control logic 150.

In operation S240, security decoding may be performed using security data stored in the register 151. The security engine 153 may perform security decoding based on the security data stored in the register 151 and security information received from an external device.

In operation S250, a security decoding result may be stored in the register 151. For example, the security decoding result may be TRUE or FALSE. In the case where the read security data and the security information are correlated, the security decoding result may be stored as TRUE. If the read security data and the security information are not correlated, the security decoding result may be stored as FALSE.

In operation S260, the security decoding result stored in the register 151 of the control logic 150 may be output to the external device.

While operations S240 and S260 are performed, in operation S270, the read/write circuit 130 may be reset. If the security data stored in the read/write circuit 130 is stored in the register 151, a subsequent operation (operations S240 to S260) may be performed based on security data stored in the register 151. If the security data is stored in the register 151, the security data stored in the read/write circuit 130 may not be required at the subsequent operation. In this case, the security data stored in the read/write circuit 130 must be inhibited from being output to the external device. Thus, if the security data is stored in the register 151, the control logic 150 may reset the read/write circuit 130. In example embodiments, although any one of operations S240 to S260 is performed, the read/write circuit 130 may be reset.

In operation S280, the register 151 of the control logic 150 may be reset. The control logic 150 may reset the register 151 to prevent an outflow of security data stored in the register 151.

Described above is an example in which a security decoding result is stored in the register 151 and is then output to the external device. However, the security decoding result can be directly output to the external device without being stored in the register 151. In this case, after the security decoding result is output, the control logic 150 may reset the read/write circuit 130 and the register 151.

Also described above is an example in which security data is stored in the register 151. However, the security data need not be stored in the register 151. For example, the control logic 150 may perform security decoding using security data stored in the read/write circuit 130. The control logic 150 may output the security decoding result to the external device without being stored in the register 151. In this case, after the security decoding result is output, the control logic 150 may reset the read/write circuit 130 and the register 151.

Figure 6:
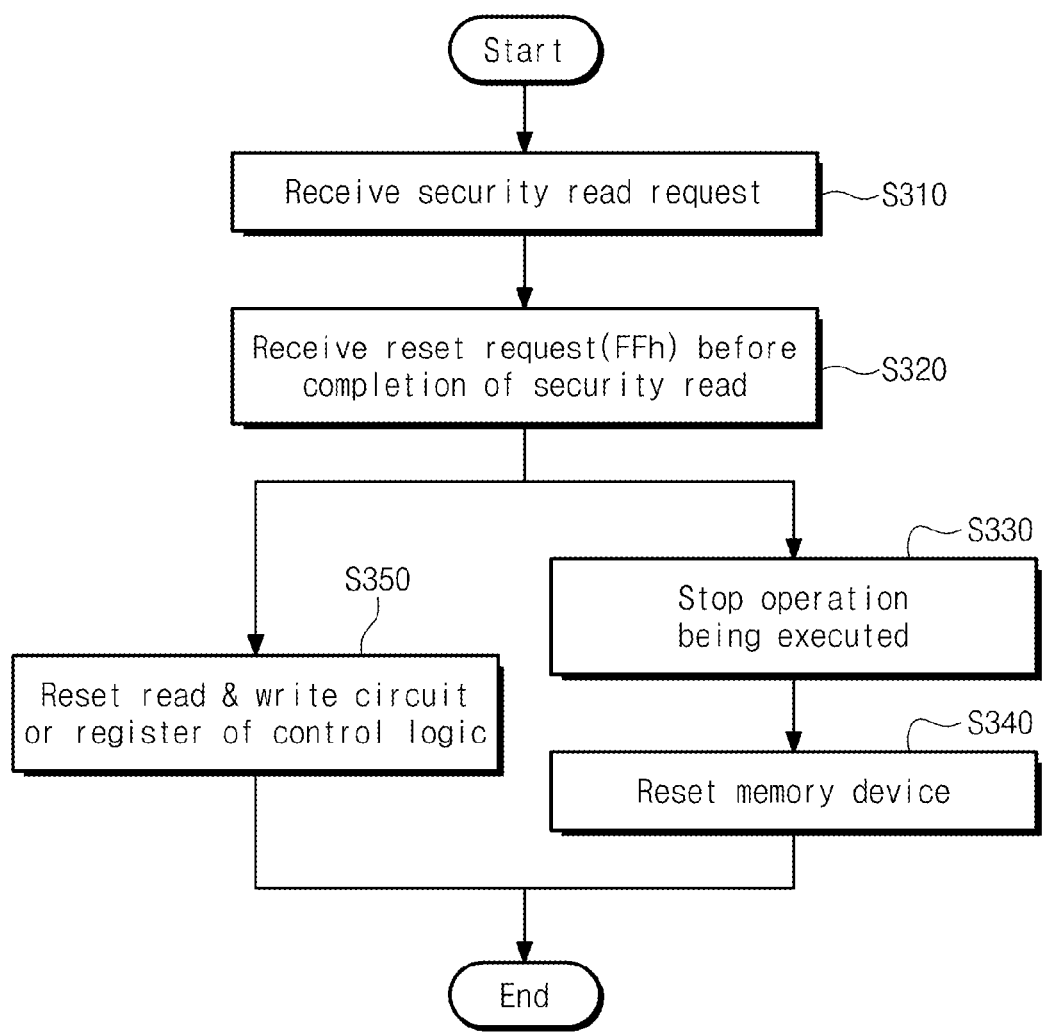
FIG. 6 is a flow chart illustrating an operation when a reset request is received during execution of a security read operation according to an embodiment of the inventive concept.

FIG. 6 is a flow chart illustrating a reset operation when a reset command (or request) is received during execution of a security read operation. In the example of this embodiment, the reset operation may be a feature of the nonvolatile memory device 100 in which a reset command (e.g. FFh) is received and written in a command register (not shown) of the control logic 150. When the memory device 100 is in a busy state (e.g., executing read, program or erase operations), the reset operation functions to stop operations being executed, and reset the memory device 100. Here, memory cells being altered are no longer valid.

Referring to FIGS. 1 and 6, in operation S310, a security read request may be received. As a result, security read operation described in FIG. 5 may be initiated according to the security read request.

In operation S320, a reset command (FFh) may be received before completion of the security read operation previously initiated.

In operation S330, an operation being executed may be stopped. In this case, since a security read operation is being performed, it may be stopped.

In operation S340, a reset operation of the memory device 100 may be performed.

Since the security read operation was being performed, read security data may be stored in a read/write circuit 130 or the read/write circuit 130 and a register 151. As described in connection with FIG. 5, when the security read operation is normally completed, the read/write circuit 130 and the register 151 may be reset. Thus, an outflow of the security data may be inhibited.

However, in the case where the reset request (FFh) is received during execution of the security read operation, the security read operation may be stopped before the read/write circuit 130 and the register 151 may be reset. If this should occur, security data may be stored in the read/write circuit 130 and/or the register 151 which can be leaked out to an external device.

Thus, in accordance with an embodiment of the inventive concept, during execution of the reset operation (S330) and (S340), the read/write circuit 130 and/or the register 151 of the control logic 150 may be reset in operation (S350) of FIG. 6. Thus, security data stored in the read/write circuit 130, the register 151 of the control logic 150, or the read/write circuit 130 and the register 151 may be prevented from being leaked out to the external device.

Figure 7:
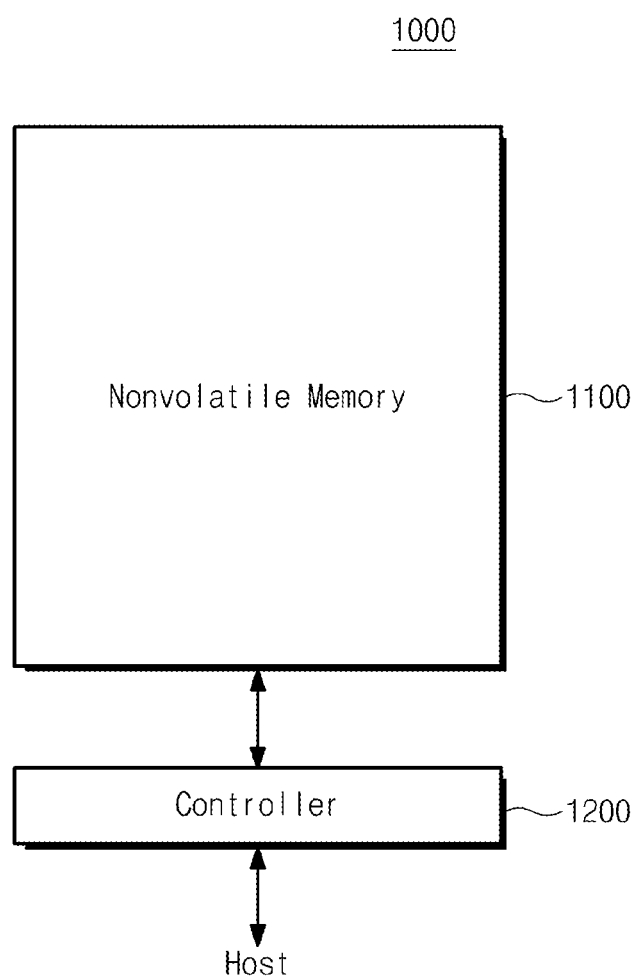
FIG. 7 is a block diagram schematically illustrating a memory system according to an embodiment of the inventive concept.

FIG. 7 is a block diagram schematically illustrating a memory system according to an embodiment of the inventive concept. Referring to FIG. 7, a memory system 1000 may include a nonvolatile memory 1100 and a controller 1200.

The nonvolatile memory 1100 may be configured the same or substantially the same as a nonvolatile memory 100 described with reference to FIG. 1. That is, if a security read request is received from the controller 1200, the nonvolatile memory 1100 may perform a security read operation, and may reset a read/write circuit 130, a register 151 of control logic 150, or the read/write circuit 130 and the register 151. If a reset command is received from the controller 1200 during the security read operation, the nonvolatile memory 1100 may reset the read/write circuit 130, the register 151 of the control logic 150, or the read/write circuit 130 and the register 151 even thought the security read operation has been stopped.

The controller 1200 may be connected with a host and the nonvolatile memory device 1100. In response to a request (or command) from the host, the controller 1200 may be configured to access the nonvolatile memory device 1100. For example, the controller 1200 may be configured to control a read operation, a write operation, an erase operation, a read operation, and a background operation of the nonvolatile memory device 1100. The controller 1200 may be configured to provide an interface between the nonvolatile memory device 1100 and the host. The controller 1200 may be configured to drive firmware for controlling the nonvolatile memory device 1100.

The controller 1200 may be configured to provide the nonvolatile memory device 1100 with a control signal CTRL, a command CMD, and an address ADDR. The controller 1200 may be configured to exchange data with the nonvolatile memory device 1100.

In example embodiments, the controller 1200 may further include constituent elements such as a RAM, a processing unit, a host interface, and a memory interface. The RAM may be used as at least one of a working memory of the processing unit, a cache memory between the nonvolatile memory device 1100 and the host, and a buffer memory between the nonvolatile memory device 1100 and the host. The processing unit may control an overall operation of the controller 1200.

The host interface may include the protocol for executing data exchange between the host and the controller 1200. Exemplarily, the host interface may communicate with an external device (e.g., the host) via at least one of various protocols such as an USB (Universal Serial Bus) protocol, an MMC (multimedia card) protocol, a PCI (peripheral component interconnection) protocol, a PCI-E (PCI-express) protocol, an ATA (Advanced Technology Attachment) protocol, a Serial-ATA protocol, a Parallel-ATA protocol, a SCSI (small computer small interface) protocol, an ESDI (enhanced small disk interface) protocol, an IDE (Integrated Drive Electronics) protocol, and a Firewire. The memory interface may interface with the nonvolatile memory device 1100. The memory interface may include a NAND interface or a NOR interface.

The memory system 1000 may be configured to further include an error detecting and correcting block. The error detecting and correcting block may be configured to detect and correct an error of data read from the nonvolatile memory device 1100 using ECC data (or, parity data). In example embodiments, the error detecting and correcting block may be provided as a constituent element of the controller 1200. In other example embodiments, the error detecting and correcting block may be provided as a constituent element of the nonvolatile memory device 1100.

The controller 1200 and the nonvolatile memory device 1100 may be integrated in one semiconductor device. For example, the controller 1200 and the nonvolatile memory device 1100 may be integrated in one semiconductor device to form a memory card. For example, the controller 1200 and the nonvolatile memory device 1100 may be integrated in one semiconductor device to form a memory card such as a PC (or, PCMCIA) card, a Compact Flash (CF) card, a SmartMedia (SM) card, a memory stick, a multimedia card (MMC, RS-MMC, MMCmicro), an SD card (SD, miniSD, SDHC), a Universal Flash Storage (UFS) device, or the like.

The controller 1200 and the nonvolatile memory device 1100 may be integrated in one semiconductor device to form a Solid State Drive (SSD). The SSD may include a storage device which is configured to store data using semiconductor memories. In case that the memory system 1000 is used as the SSD, an operating speed of a host connected with the memory system 1000 may be remarkably improved.

In example embodiments, the memory system 1000 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting telematics network, RFID, or one of various electronic devices constituting a computing system.

In example embodiments, a nonvolatile memory device 1100 or a memory system 1000 may be packed by various types of packages such as PoP (Package on Package), Ball grid arrays (BGAs), Chip scale packages (CSPs), Plastic Leaded Chip Carrier (PLCC), Plastic Dual In-Line Package (PDI2P), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

Figure 8:
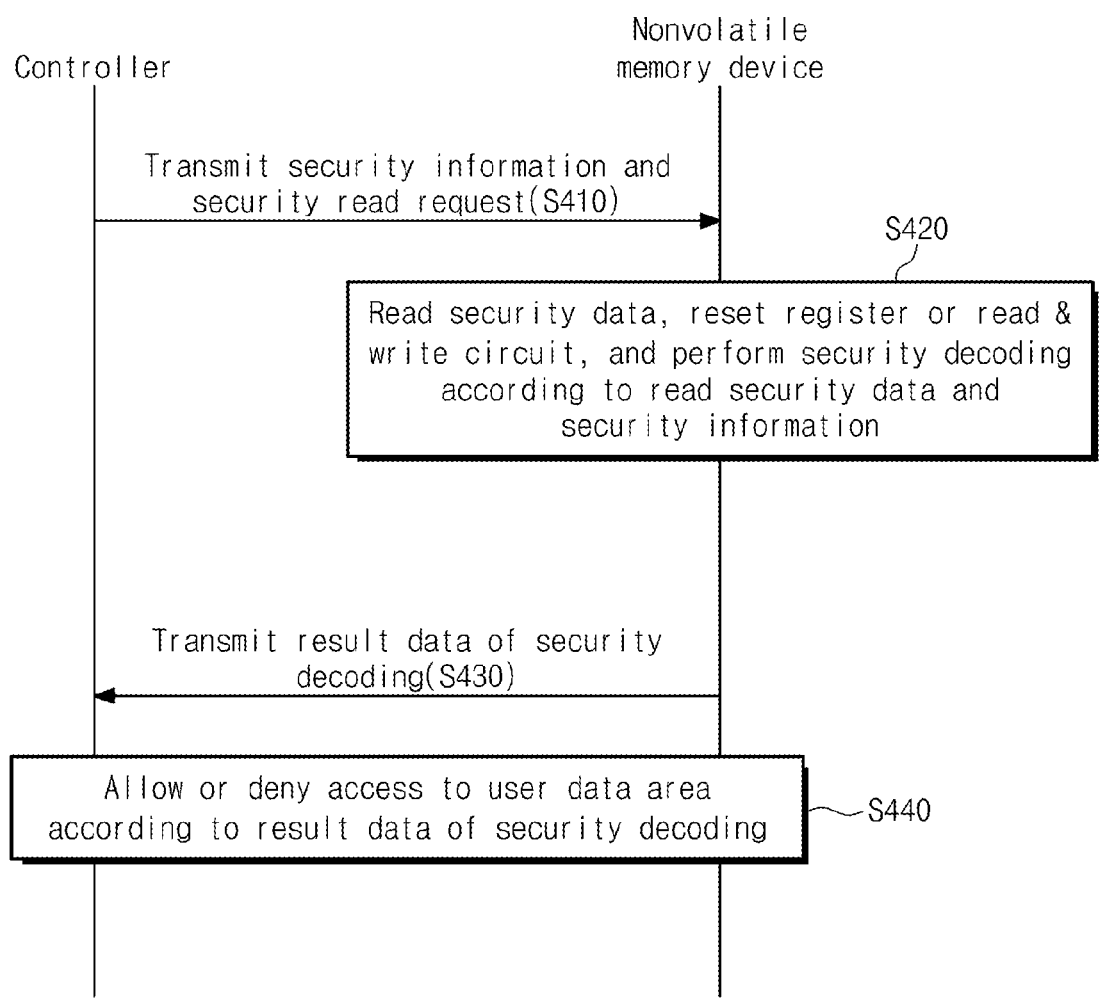
FIG. 8 is a flow chart illustrating a read method of the memory system shown in FIG. 7 according to an embodiment of the inventive concept.

FIG. 8 is a flow chart illustrating a read method of a memory system in shown in FIG. 7 according to an embodiment of the inventive concept. Referring to FIGS. 1, 7, and 8, in operation S410, a controller 1200 may transfer security information and a security read request to a nonvolatile memory 1100. The controller 1200 may receive security information from an external host to send it to the nonvolatile memory 1100.

In operation S420, the nonvolatile memory 1100 may perform a security read operation. In response to the security read request, the nonvolatile memory 1100 may read security data, reset a register 151 and a read/write circuit 130, and perform security decoding according to the read security data and the input security information. The nonvolatile memory 1100 may perform a read operation according to a read method described with reference to FIG. 5. In the case where the controller 1200 sends a reset request to the nonvolatile memory 1100, the nonvolatile memory 1100 may operate according to a method described with reference to FIG. 6.

In operation S430, the nonvolatile memory 1100 may send a security decoding result to the controller 1200.

In operation S440, an access to a user data area 113 of the nonvolatile memory 1100 may be allowed or inhibited according to the security decoding result. For example, when the security decoding result is TRUE, the external host may take security information (e.g., a security key) associated with security data stored in the nonvolatile memory 1100. At this time, the memory system 1000 may allow the external host to access the user data area 113 of the nonvolatile memory 1100. When the security decoding result is FALSE, the external host may not take security information (e.g., a security key) associated with security data stored in the nonvolatile memory 1100. At this time, the memory system 1000 may inhibit the external host from accessing the user data area 113 of the nonvolatile memory 1100.

For example, the nonvolatile memory 1100 may allow or inhibit an access to the user data area 113 of the nonvolatile memory 1100 according to the security decoding result. The controller 1200 may allow or inhibit an access to the user data area 113 of the nonvolatile memory 1100 according to the security decoding result. Each of the nonvolatile memory 1100 and the controller 1200 may allow or inhibit an access to the user data area 113 according to the security decoding result.

Figure 9:
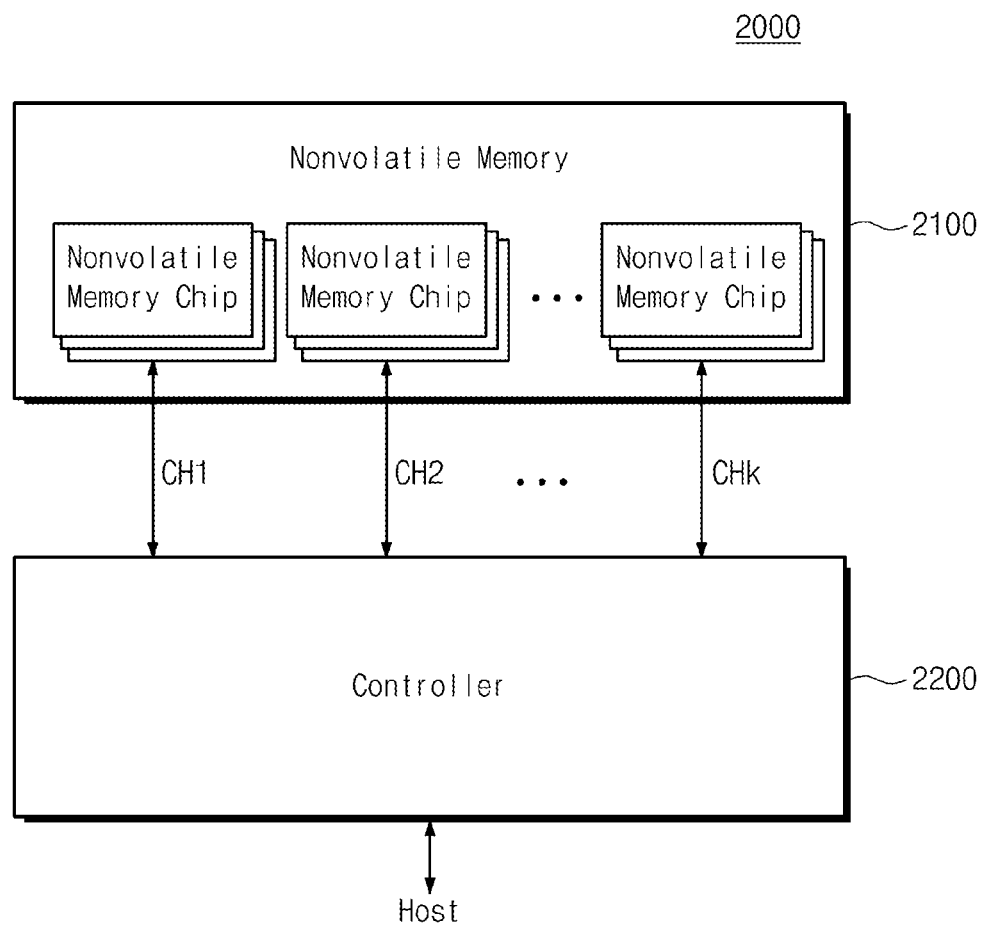
FIG. 9 is a block diagram illustrating an example of an application of the memory system shown in FIG. 7.

FIG. 9 is a block diagram illustrating an application of a memory system in FIG. 8. Referring to FIG. 9, a memory system 2000 may include a nonvolatile memory 2100 and a controller 2200. The nonvolatile memory 2100 may include a plurality of nonvolatile memory chips, which form a plurality of groups. Nonvolatile memory chips in each group may be configured to communicate with the controller 2200 via one common channel. In example embodiments, the plurality of nonvolatile memory chips may communicate with the controller 2200 via a plurality of channels CH1 to CHk.

Each nonvolatile memory chip may be configured the same or substantially the same as a nonvolatile memory 100 described with reference to FIG. 1. That is, if a security read request is received from the controller 2200, each nonvolatile memory chip may perform a security read operation, and may reset a read/write circuit 130, a register 151 of control logic 150, or the read/write circuit 130 and the register 151. If a reset command is received from the controller 2200 during the security read operation, each nonvolatile memory chip may reset the read/write circuit 130, the register 151 of the control logic 150, or the read/write circuit 130 and the register 151 even thought the security read operation is stop.

In FIG. 9, there is described the case that one channel is connected with a plurality of nonvolatile memory chips. However, the memory system 2000 can be modified such that one channel is connected with one nonvolatile memory chip.

Figure 10:
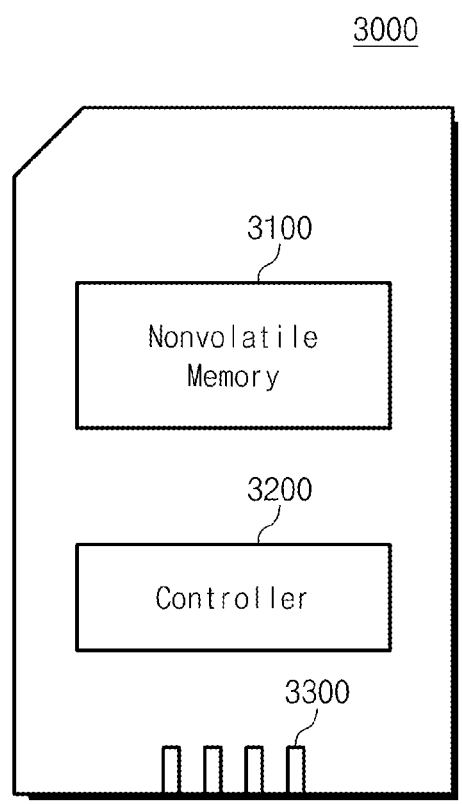
FIG. 10 is a diagram illustrating a memory card according to an embodiment of the inventive concept.

FIG. 10 is a diagram illustrating a memory card according to an embodiment of the inventive concept. Referring to FIGS. 1 and 10, a memory card 3000 may include a nonvolatile memory 3100, a controller 3200, and a connector 3300.

The nonvolatile memory 3100 may be configured the same or substantially the same as a nonvolatile memory 100 described with reference to FIG. 1. That is, if a security read request is received from the controller 3200, the nonvolatile memory 3100 may perform a security read operation, and may reset a read/write circuit 130, a register 151 of control logic 150, or the read/write circuit 130 and the register 151. If a reset request is received from the controller 3200 during the security read operation, the nonvolatile memory 3100 may reset the read/write circuit 130, the register 151 of the control logic 150, or the read/write circuit 130 and the register 151 even though the security read operation is stopped.

The connector 3300 may connect the memory card 3000 electrically with a host.

The memory card 3000 may be formed of memory cards such as a PC (PCMCIA) card, a CF card, an SM (or, SMC) card, a memory stick, a multimedia card (MMC, RS-MMC, MMCmicro), a security card (SD, miniSD, microSD, SDHC), a universal flash storage (UFS) device, and the like.

Figure 11:
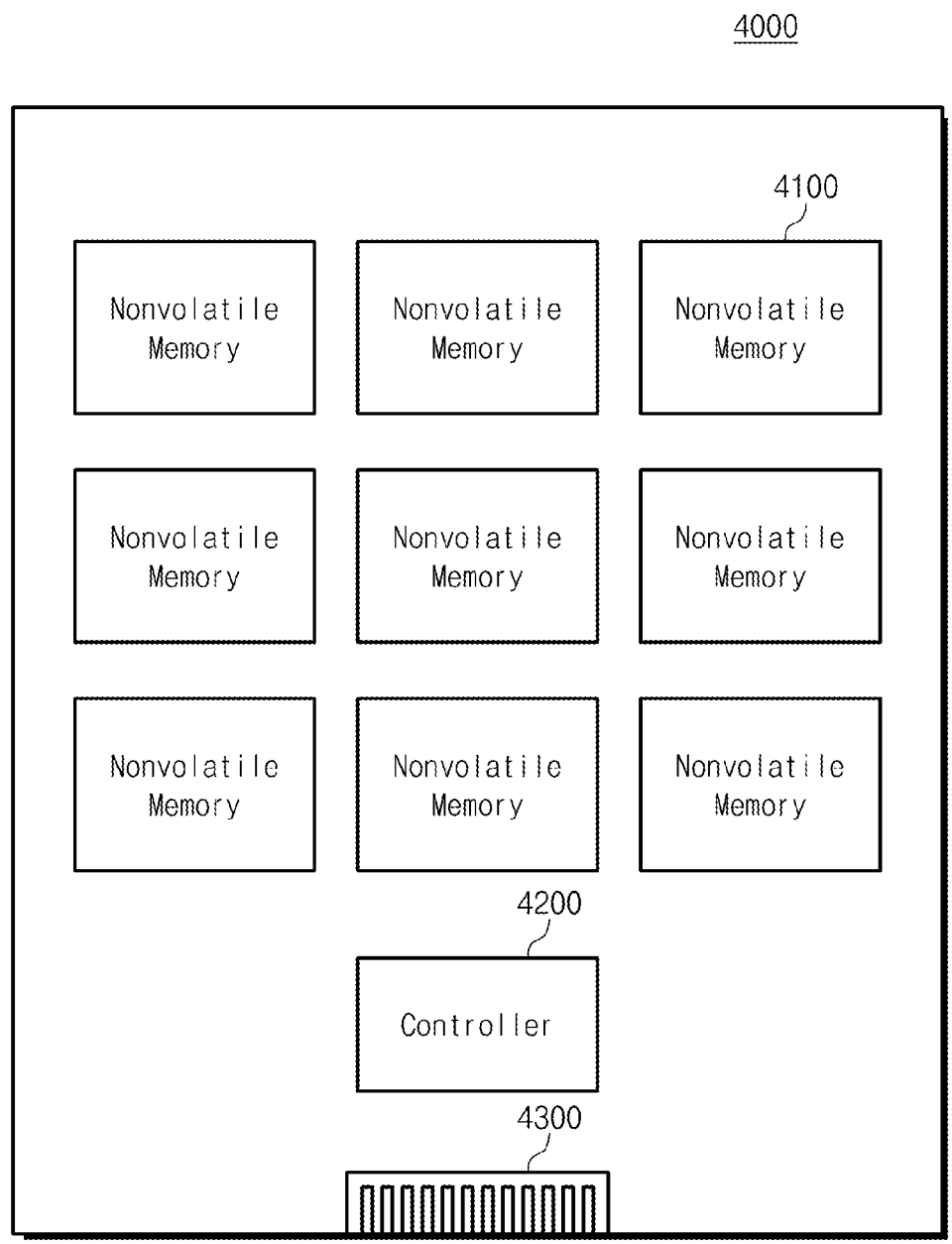
FIG. 11 is a diagram illustrating a solid state drive according to an embodiment of the inventive concept.

FIG. 11 is a diagram illustrating a solid state drive according to an embodiment of the inventive concept. Referring to FIGS. 1 and 11, a solid state drive 4000 may include a plurality of nonvolatile memories 4100, a controller 4200, and a connector 4300.

Each of the nonvolatile memories 4100 may be configured the same or substantially the same as a nonvolatile memory 100 described with reference to FIG. 1. That is, if a security read request is received from the controller 4200, each of the nonvolatile memories 4100 may perform a security read operation, and may reset a read/write circuit 130, a register 151 of control logic 150, or the read/write circuit 130 and the register 151. If a reset request is received from the controller 4200 during the security read operation, each of the nonvolatile memories 4100 may reset the read/write circuit 130, the register 151 of the control logic 150, or the read/write circuit 130 and the register 151 even though the security read operation is stopped.

The connector 4300 may connect the solid state driver 4000 electrically with a host.

Figure 12:
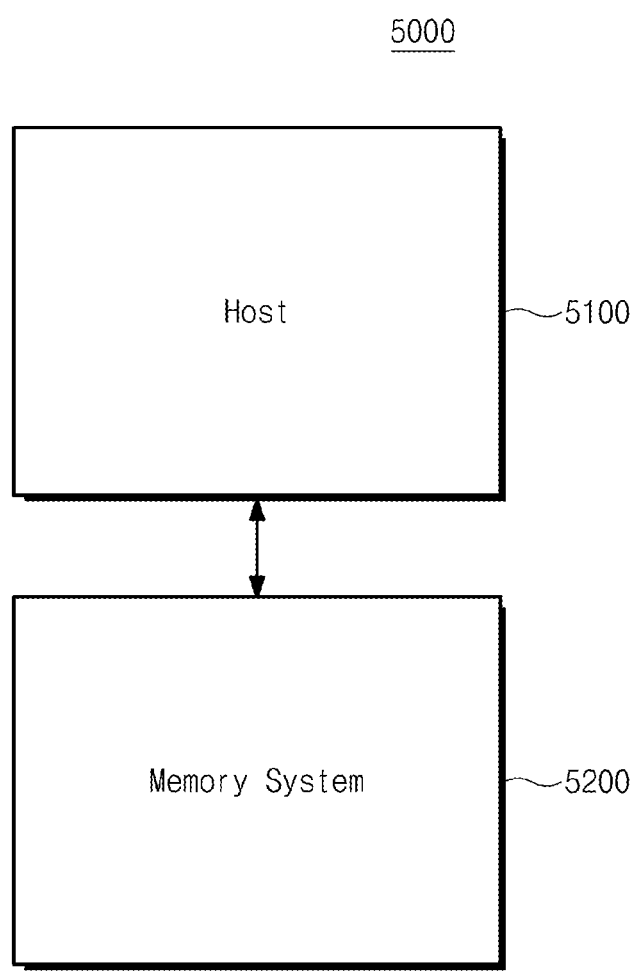
FIG. 12 is a memory system according to an embodiment of the inventive concept.

FIG. 12 is a memory system according to an embodiment of the inventive concept. Referring to FIG. 12, a host system 5000 may include a host 5100 and a memory system 5200.

The memory system 5200 may be configured the same or substantially the same as a memory system 1000 described with reference to FIG. 7.

The host 5100 may access the memory system 5200. The host 5100 may send security information (e.g., a security key) to the memory system 5200, and may access the memory system 5200 according to a security decoding result of the memory system 5200.

The host 5100 may include a variety of electronic devices controlling a storage medium, such as a smart phone, a smart pad, a computer, a notebook computer, a netbook, a digital camera, a digital camcorder, a smart television, a smart monitor, and so on.

Figure 13:
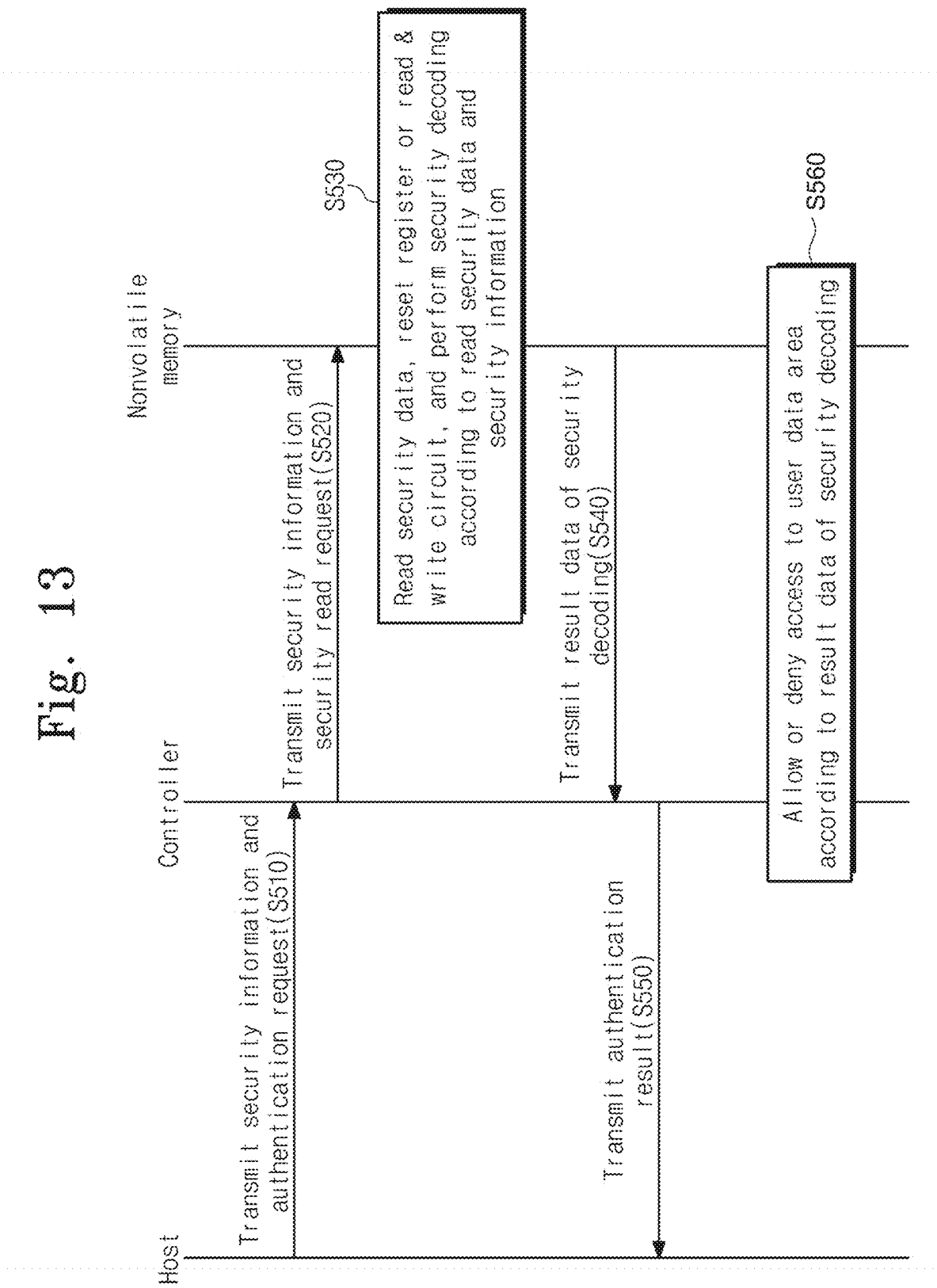
FIG. 13 is a flow chart illustrating an example of an operating method of the host system shown in FIG. 12.

FIG. 13 is a flow chart illustrating an operating method of a host system in FIG. 12. Referring to FIGS. 1, 7, 12, and 13, in operation S510, a host 5100 may send security information and authentication request to a controller (e.g., 1200) of a memory system 5200.

In operation S520, the controller 1200 may send the security information and authentication request to a nonvolatile memory (e.g., 1100) of the memory system 5200.

In operation S530, the nonvolatile memory 1100 may read security data, reset a register 151 and a read/write circuit 130, and perform security decoding according to the input security information and the read security data. The nonvolatile memory 1100 may operate according to a read method described with reference to FIG. 5. In the case that the controller 1200 sends a reset request to the nonvolatile memory 1100, the nonvolatile memory 1100 may operate according to a method described with reference to FIG. 6.

In operation S540, the nonvolatile memory 1100 may send a security decoding result to the controller 1200.

In operation S550, the controller 1200 may send an authentication result to the host 5100. The authentication result may include a security decoding result indicating TRUE or FALSE. The authentication result may include data obtained by processing the security decoding result as TRUE or FALSE.

In operation S560, the memory system including the controller 1200 and the nonvolatile memory 1100 may allow or inhibit an access to a user data area 113 according to the security decoding result.

If the security decoding result is TRUE, the host 5100 may access the user data area 113 of the nonvolatile memory 1100. For example, the host 5100 may read contents programmed at the user data area 113 and program contents at the user data area 113.

If the security decoding result is FALSE, the host 5100 may not access the user data area 113 of the nonvolatile memory 1100. The host 5100 may not read contents programmed at the user data area 113 and may not program contents at the user data area 113.

In example embodiments, data or contents programmed at the user data area 113 may be encoded data. Encoding and decoding of contents may be performed by the host 5100.

Figure 14:
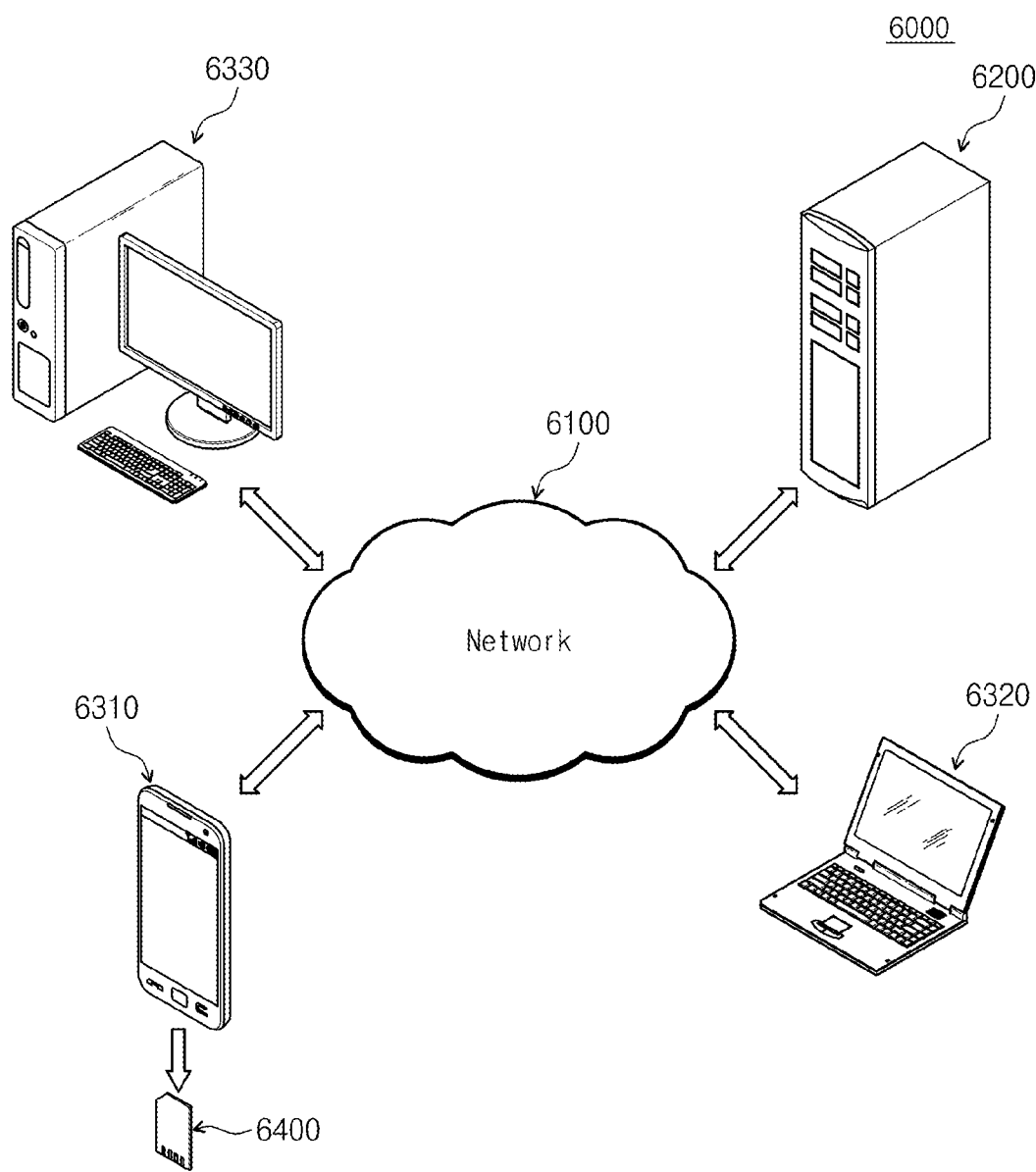
FIG. 14 is a block diagram schematically illustrating a contents managing system according to an embodiment of the inventive concept.

FIG. 14 is a block diagram schematically illustrating a contents managing system according to an embodiment of the inventive concept. Referring to FIG. 14, a contents managing system 6000 may include a network 6100, a contents managing server 6200, a plurality of hosts 6310, 6320, and 6330, and a nonvolatile storage medium 6400.

The network 6100 may provide a channel among connected constituent elements. The network 6100 may include an internet, an intranet, a cable network, or an Adhoc network.

The contents managing server 6200 may be connected to the network 6100. The contents managing server 6200 may manage contents via the network 6100.

The plurality of hosts 6310, 6320, and 6330 may be connected to the network 6100. The hosts 6310, 6320, and 6330 may acquire access authority of contents according to management of the contents managing server 6200. Each of the hosts 6310, 6320, and 6330 may include a smart phone, a smart pad, a computer, a notebook computer, a netbook, a digital camera, a digital camcorder, a smart television, a smart monitor, and so on.

Each of the hosts 6310, 6320, and 6330 may be connected to the nonvolatile storage medium 6400. In FIG. 14, there is illustrated an example in which the host 6310 is connected to the nonvolatile storage medium 6400. The nonvolatile storage medium 6400 may include storages, which are formed of nonvolatile memories, such as a memory card, a solid state drive, and so on. The nonvolatile storage medium 6400 may include a memory system 1000 described with reference to FIG. 7.

Under the control of the contents managing server 6200, each of the hosts 6310, 6320, and 6330 may access contents stored in the nonvolatile storage medium 6400 or program contents at the nonvolatile storage medium 6400.

Figure 15:
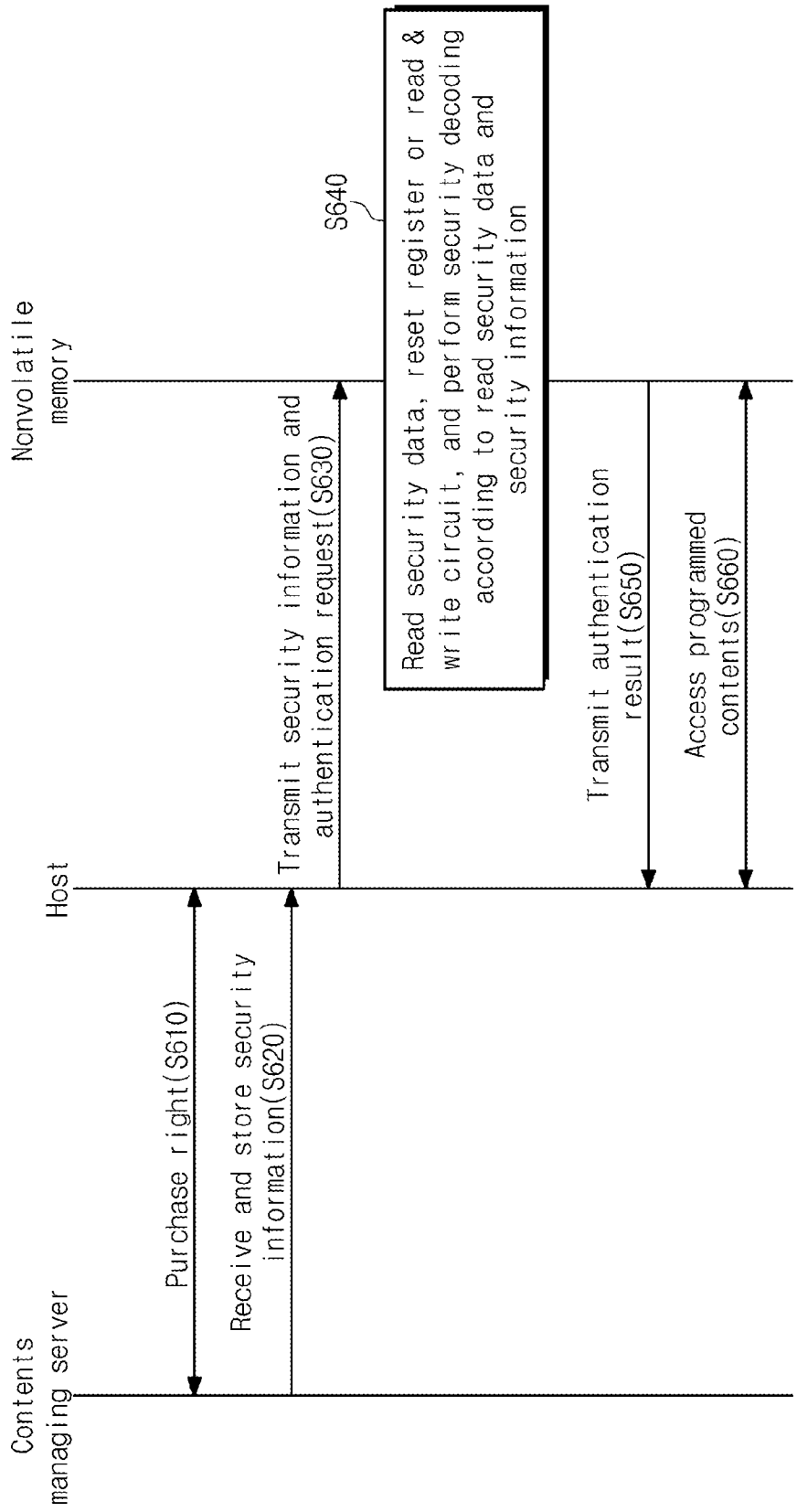
FIG. 15 is a flow chart illustrating an operating method of a contents managing system according to an embodiment of the inventive concept.

FIG. 15 is a flow chart an operating method of a contents managing system according to an embodiment of the inventive concept. Referring to FIGS. 1, 14, and 15, in operation S610, a host 6310 may buy authority from a contents managing server 6200. For example, the host 6310 may buy authority capable of using specific contents from the contents managing server 6200. The specific contents may be contents stored in a nonvolatile storage medium 6400.

In operation S620, the host 6310 may receive and store security information from the contents managing server 6200. For example, the host 6310 may receive security information (e.g., a security key) associated with security data stored in the nonvolatile storage medium 6400 from the contents managing server 6200.

In operation S630, the host 6310 may send security information and an authentication request to the nonvolatile storage medium 6400.

In operation S640, the nonvolatile storage medium 6400 may read security data, reset a register 151 and a read/write circuit 130, and perform security decoding according to the input security information and the read security data. The nonvolatile storage medium 6400 may operate according to a read method described with reference to FIGS. 4 and 5.

In operation S650, the nonvolatile storage medium 6400 may send an authentication result to the host 6310. Since the host 6310 buys authority from the contents managing server 6200 and receives security information, the authentication result may be TRUE.

In operation S660, the host 6310 may access contents programmed at the nonvolatile storage medium 6400.

In example embodiments, the host 6310 may receive and store security information corresponding to a plurality of nonvolatile storage mediums. The host 6310 may receive identification information from the nonvolatile storage medium 6400, and may transfer security information corresponding to the input identification information of stored security information to the nonvolatile storage medium 6400.

In example embodiments, the host 6310 may receive identification information from the nonvolatile storage medium 6400 to send the input identification information to the contents managing server 6200. The contents managing server 6200 may send security information corresponding to the identification information to the host 6310.

Figure 16:
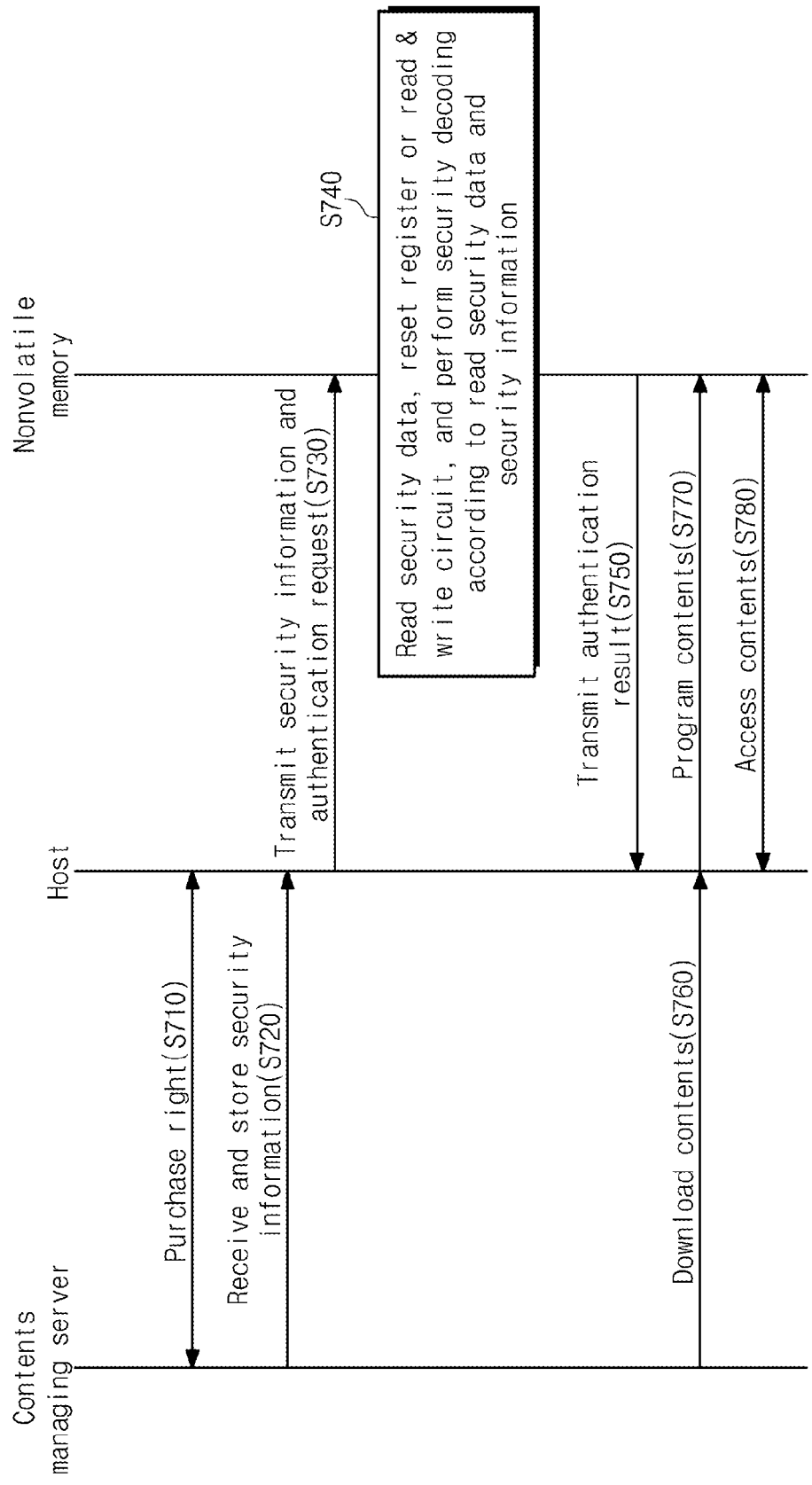
FIG. 16 is a flow chart illustrating an operating method of a contents managing system according to another embodiment of the inventive concept.

FIG. 16 is a flow chart an operating method of a contents managing system according to another embodiment of the inventive concept. Referring to FIGS. 1, 14, and 16, in operation S710, a host 6310 may buy authority from a contents managing server 6200. For example, the host 6310 may buy authority capable of using specific contents from the contents managing server 6200.

In operation S720, the host 6310 may receive and store security information from the contents managing server 6200.

In operation S730, the host 6310 may send security information and an authentication request to the nonvolatile storage medium 6400.

In operation S740, the nonvolatile storage medium 6400 may read security data, reset a register 151 and a read/write circuit 130, and perform security decoding according to the input security information and the read security data. The nonvolatile storage medium 6400 may operate according to a read method described with reference to FIGS. 4 and 5.

In operation S750, the nonvolatile storage medium 6400 may send an authentication result to the host 6310. Since the host 6310 buys authority from the contents managing server 6200 and receives security information, the authentication result may be TRUE.

In operation S760, the host 6310 may download contents from the contents managing server 6200. In operation S770, the host 6310 may program the downloaded contents at the nonvolatile storage medium 6400. In example embodiments, contents may be downloaded according to one of various methods such as direct downloading through a server, streaming, pear-to-pear, multicasting, broadcasting, and so on.

In operation S780, the host 6310 may access contents programmed at the nonvolatile storage medium 6400.

In example embodiments, the host 6310 may receive and store security information corresponding to a plurality of nonvolatile storage mediums. The host 6310 may receive identification information from the nonvolatile storage medium 6400, and may transfer security information corresponding to the input identification information of stored security information to the nonvolatile storage medium 6400.

In example embodiments, the host 6310 may receive identification information from the nonvolatile storage medium 6400 to send the input identification information to the contents managing server 6200. The contents managing server

6200 may send security information corresponding to the identification information to the host 6310.

An access to user data stored in a nonvolatile memory may be allowed or inhibited according to a decoding result of security data stored in the nonvolatile memory and security information transferred from a host. At a security data read operation, devices for temporarily storing security data may be reset. Thus, it is possible to prevent security data stored in the nonvolatile memory from be leaked out to an external device. Further, there may be provided a nonvolatile memory having improved security, a read method of the nonvolatile memory, and a memory system including the nonvolatile memory.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A read method of a nonvolatile memory, the nonvolatile memory including a memory cell array and a read/write circuit connected to the memory cell array through bit lines, the method comprising:
   receiving a security read request;
   receiving security information; and
   executing a security read operation in response to the security read request, the security read operation including reading of security data from the memory cell array using the read/write circuit, storing of the read security data in a register, performing security decoding on the read security data stored in the register using the received security information, resetting the read/write circuit, and outputting a result of the security decoding,
   wherein the resetting of the read/write circuit is performed after the storing of the read security data in the register.

2. The read method of claim 1, further comprising:
   allowing an access to user data stored in the nonvolatile memory when the result of the security decoding indicates that the read security data and the security information are correlated; and
   inhibiting the access to user data stored in the nonvolatile memory when the result of the security decoding indicates that the read security data and the security information are not correlated.

3. The read method of claim 1, wherein the result of the security decoding is stored in the register.

4. The read method of claim 3, wherein the result of the security decoding stored in the register is output to an external device.

5. The read method of claim 1, further comprising:
   resetting the register after the result of the security decoding is output.

6. The read method of claim 1, further comprising:
   receiving a reset request during execution of the security read operation;
   executing a reset operation which includes stopping execution of the security read operation and resetting the nonvolatile memory responsive to the read request; and
   resetting the register during execution of the reset operation.

7. The read method of claim 1, further comprising:
   receiving a reset request during execution of the security read operation;
   executing a reset operation which includes stopping execution of the security read operation and resetting the nonvolatile memory responsive to the read request; and
   resetting the read/write circuit during execution of the reset operation.

8. A nonvolatile memory, comprising:
   a memory cell array including a security data area and a user data area;
   a read/write circuit connected to the memory cell array through bit lines; and
   control logic including a register,
   wherein the control logic is configured to execute a security read operation in response to a received security read request and security information, the security read operation including reading of security data from the security data area of the memory cell array using the read/write circuit, storing of the read security data in the register of the control logic, performing security decoding on the read security data stored in the register using the received security information, resetting the read/write circuit, and outputting a result of the security decoding,
   wherein the control logic is configured to reset the read/write circuit after the read security data is stored in the register.

9. The nonvolatile memory of claim 8, wherein the control logic is further configured to reset the register after the result of the security decoding is output.

10. The nonvolatile memory of claim 9, wherein the nonvolatile memory is configured to allow an access to user data stored in the user data area of the memory cell array when the result of the security decoding indicates that the read security data and the security information are correlated, and to inhibit the access to the user data stored in the user data area of the memory cell array when the result of the security decoding indicates that the read security data and the security information are not correlated.

11. The nonvolatile memory of claim 8, wherein when a reset request is received during execution of the security data operation, the control logic is configured to execute a reset operation which includes stopping execution of the security read operation and resetting the nonvolatile memory, and to reset at least one of the register and the read/write circuit during execution of the reset operation.

12. A memory system, comprising:
   a nonvolatile memory including a memory cell array and a read/write circuit, the memory cell array including a security data area and a user data area, and the read/write circuit connected to the memory cell array through bit lines; and
   a controller configured to control the nonvolatile memory,
   wherein the nonvolatile memory is configured to execute a security read operation in response to a security read request and security information received from the controller, the security read operation including reading of security data from the security data area of the memory cell array using the read/write circuit, performing security decoding on the read security data using the received security information, resetting the read/write circuit, and outputting a result of the security decoding,
   wherein the nonvolatile memory further includes a register configured to store the security data read using the read/write circuit, and wherein the nonvolatile memory is configured to reset the read/write circuit after the read security data is stored in the register.

13. The memory system 12, wherein the nonvolatile memory is configured to output the result of the security decoding to the controller.

14. The memory system 13, wherein the controller is configured to allow an access to user data stored in user data area of the memory cell array when the result of the security decoding indicates that the read security data and the security information are correlated, and to inhibit the access to the user data stored in the user data area of the memory cell array when the result of the security decoding indicates that the read security data and the security information are not correlated.

15. The memory system 12, wherein when a reset request is received from the controller by nonvolatile memory during execution of the security data operation, the nonvolatile memory is configured to execute a reset operation which includes stopping execution of the security read operation and resetting the nonvolatile memory, and to reset the read/write circuit during execution of the reset operation.

16. The memory system of claim 12, wherein the nonvolatile memory is configured to reset the register after execution of the security read operation.

17. The memory system of claim 12, wherein the nonvolatile memory and the controller are packaged together in a memory card.

\* \* \* \* \*